Figure 1:
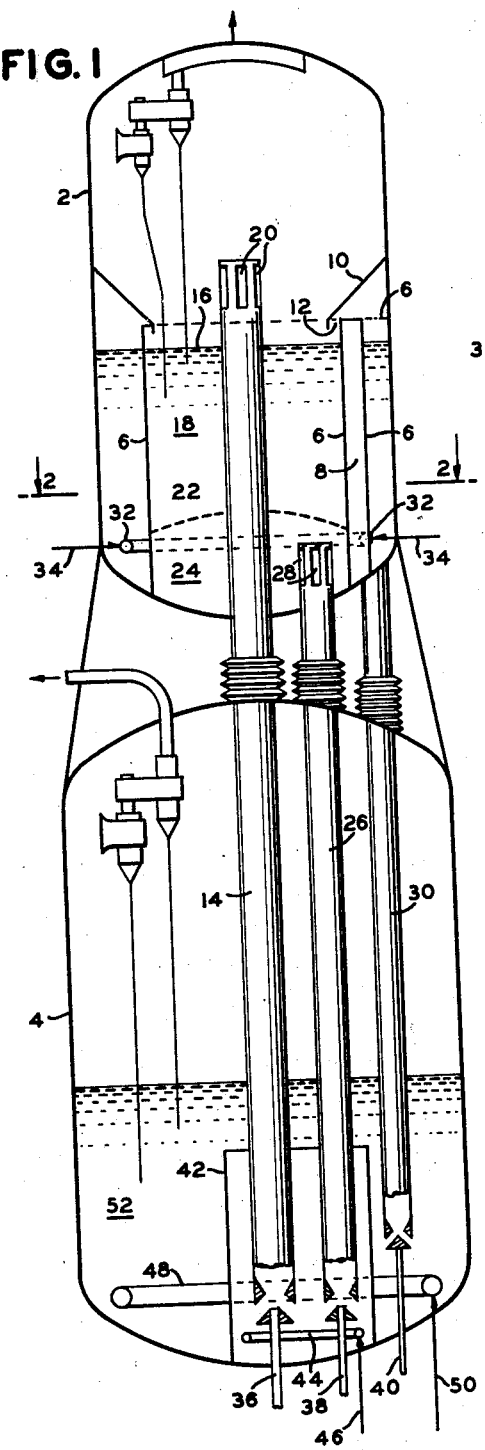
Figure 2:
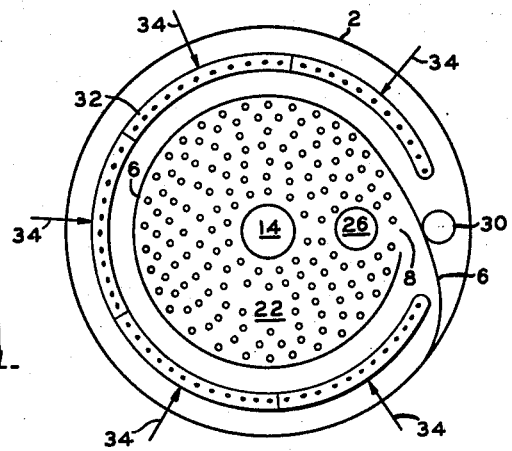
Figure 3:
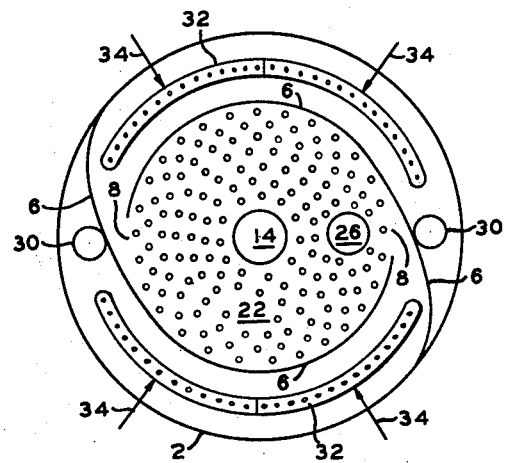

July 28, 1964 E. F. SCHWARZENBEK ETAL 3,142,542
FLUID CONTACT SYSTEM
Filed Oct. 14, 1960

INVENTORS
EUGENE F. SCHWARZENBEK
CHARLES E. SLYNGSTAD
BY *G. H. Galmer*
ATTORNEY
*Carl D. Farnsworth*
AGENT

United States Patent Office 3,142,542
Patented July 28, 1964

3,142,542
FLUID CONTACT SYSTEM
Eugene F. Schwarzenbek, Short Hills, and Charles E. Slyngstad, Rutherford, N.J., assignors to Pullman Incorporated, a corporation of Delaware
Filed Oct. 14, 1960, Ser. No. 62,707
13 Claims. (Cl. 23—288)

This invention relates to a method and arrangement of apparatus for contacting subdivided solid particle material with several different gasiform materials. In one aspect the invention is directed to the segregated conversion of different hydrocarbon feed materials in the presence of finely divided catalytic material and the recovery of valuable hydrocarbon product material from the catalytic material.

It is an object of this invention to provide a method and arrangement of process steps for contacting at least two different fluid reactant materials simultaneously with separate portions of subdivided particle material under desired conditions.

Another object of this invention is to provide an improved arrangement for handling subdivided particle material in a sequence of treating steps within a unitary system for the conversion of different hydrocarbon reactant materials and the recovery of product material therefrom.

A further object of this invention relates to the method of withdrawing catalytic material from a dense fluid bed of catalytic material in the hydrocarbon conversion zone and treating the thus withdrawn catalyst to remove hydrocarbonaceous material therefrom.

Other objects and advantages of the improved method and means of this invention will be more clearly evident from the following description.

In a broad aspect the improved system for contacting subdivided solid particle material with gasiform reactant material either completely or partially vaporized comprises maintaining an upflowing suspension of particulate material and gasiform reactant material in a plurality of separate and parallel arranged elongated confined reaction zones, one of which discharges to maintain a dense fluid bed of particle material thereabove in a reactor compartment with another of the elongated reaction zones discharging above the upper dense phase level of said dense fluid bed of particle material. Finely divided particle material containing entrained reactant material and products thereof is withdrawn in the method of this invention tangentially from substantially the total height of a dense fluid bed of catalyst in the reactor compartment and passed into one end of at least one elongated confined annular stripping compartment juxtapositioned and in indirect heat exchange with said dense fluid bed of particle material. Accordingly, the relatively dense fluid bed of particle material passed tangentially to one end of the elongated confined stripping compartment is maintained in a relatively dense fluidized condition therein under elevated temperature conditions by introducing gasiform stripping material to the lower portion of the annular chamber while flowing the fluid bed of particle material generally horizontally or longitudinally through the annular stripper compartment to a withdrawal means or conduit positioned in the opposite end thereof. Stripped particulate material is withdrawn by the withdrawal means from the annular stripping compartment and passed as a confined stream to a regenerator compartment wherein non-strippable material remaining adsorbed on the particulate material is removed therefrom.

More particularly, the invention relates to an improved combination of process steps for the segregated cracking of dissimilar hydrocarbon feed materials and is particularly directed to the recovery of hydrocarbon materials entrained with the catalyst in a stripping zone circumscribing at least a portion of a reaction zone containing a relatively dense fluid bed of catalytic material therein. In the method of this invention, there is at least one longitudinally elongated annular stripping zone provided through which the relatively dense fluid bed of catalytic material moves generally horizontally while in contact with gaseous stripping material introduced to the lower portion thereof so that the catalyst is continuously contacted with increments of fresh stripping gas while maintaining the catalyst at an elevated temperature substantially equal to or above the temperature of the fluid bed of catalyst in the reaction zone. The stripping gas may be introduced to the lower or bottom portion of the annular stripping zone through one or more distributor manifolds supplied by a common source with gaseous material or a plurality of independent gas flow controlled distributor means may be employed in the lower portion of the annular stripping zone. When employing a plurality of separate distributor means separately supplied with gaseous stripping material independent control of the flow of stripping gas passed to each distributor and the dense fluid bed thereabove is provided. By this arrangement, the superficial velocity of the stripping gas passed upwardly through the finely divided catalytic material in the annular stripper may be independently controlled over a relatively wide range of from about 0.1 to about 3 feet per second to permit changing or maintaining the catalyst bed density the same as or of a different density within various portions or sections of the annular stripper zone as desired. For example, the fluid bed of catalytic material may be maintained more dense in an initial portion of the annular stripper than in a latter portion or vice versa.

In a specific aspect of the method described herein catalytic material discharged from the plurality of elongated confined conversion zones and to form a relatively dense fluidized bed of catalytic material in the lower portion of a reaction zone superimposed by a dilute phase of catalytic material contains difficulty vaporizable hydrocarbonaceous material adsorbed on the catalyst, as well as vaporous hydrocarbon materials entrapped within the fluid bed of catalyst. To recover these valuable hydrocarbon materials, the catalyst is withdrawn through a vertical, substantially tangential opening from substantially the total vertical height of the dense fluid bed of catalyst in the reactor to provide a catalyst mass flow velocity longitudinally through the annular stripper of at least about 250 lbs. per minute per square foot, more usually from about 500 to about 1000 lbs. per minute per square foot. That is, a continuous dense fluid bed of catalyst exists in the reaction zone and the stripping zone which moves directly from the reaction zone into one end of at least one elongated confined stripping zone circumscribing at least a portion of the dense fluid bed of catalyst in the reaction zone. The elongated stripping zone is of a width and length sufficient to provide a catalyst residence time therein of at least about 0.5 minute, preferably greater than 1 minute residence time as the catalyst moves in a fluid bed condition longitudinally through the elongated stripping zone. In the elongated stripping zone the catalytic material is maintained at elevated hydrocarbon decomposition temperatures in the range of from about 800° F. to about 1000° F. in the presence of fluidizing stripping gas to effect removal of volatile hydrocarbon material entrained with the catalyst and in addition to effect decomposition and recovery of hydrocarbon material adsorbed on the catalyst. That is, the hydrocarbon material adsorbed on the catalyst is subjected to an extended period of hydrocarbon decomposition or cracking conditions while being contacted with increments of fresh fluidizing stripping gas. Gaseous stripping materials which may be effectively employed herein include steam, nitrogen, carbon dioxide, combustion gases and combinations thereof or any other suitable gasiform material may be employed which will be effective for removing entrained and volatile hydrocarbon materials from the catalyst.

In the method of this invention, the regeneration compartment may be positioned above, below or beside the stripper-reactor compartment. In any of these arrangements of apparatus suitably connecting conduits will be provided between the regenerator chamber and the inlet of the riser-reactors, as well as between the stripping chamber and the regenerator chamber, it being essential, however, to maintain the apparatus relationship between the annular stripping chamber and the reactor chamber, as described herein. In a specific embodiment of the apparatus of this invention the regenerator chamber is positioned below the reactor-stripper chamber in a unitary vessel so that substantially vertical riser-reactors of desired size and length may be provided to obtain desired conversion residence time of hydrocarbon material passed with catalyst upwardly therethrough. A suitable substantially vertical standpipe is also provided for passage of stripped catalyst to the regenerator. Accordingly the unitary vessel of this invention comprises an upper cylindrical reactor chamber of smaller diameter than a lower cylindrical regenerator chamber, at least one annular stripping chamber positioned about the lower portion of the reactor chamber and circumscribing a cylindrical compartment formed by a common vertical cylindrical baffle member opening tangentially in at least one vertical portion to the upper portion of the annular stripping chamber, with one edge of said cylindrical baffle member being extended beyond said vertical opening and joined substantially tangentially with the cylindrical wall of the reactor chamber to separate the inlet end of the annular compartment from the catalyst withdrawal end, the top of the annular stripping chamber being covered by a spaced apart annular non-perforated baffle member sloping downwardly from the cylindrical wall of the reactor chamber at an angle of at least about 45° and greater than the angle of repose of finely divided contact material employed therein, thereby forming an open annular passageway with at least the upper edge of the cylindrical baffle member, a perforated distributor grid positioned across the lower cross-section and above the bottom of the cylindrical compartment to form a distributor compartment below the grid, a first riser conduit coaxially aligned with respect to said cylindrical compartment extending upwardly from the lower portion of the regenerator chamber into an upper portion of the reactor chamber, a second riser conduit extending from the lower portion of the regenerator chamber upwardly into and terminating within the distributor compartment, at least one standpipe communicating between the withdrawal end of the annular stripping chamber and the lower portion of the regenerator chamber, said standpipe being positioned at the opposite longitudinal end of the annular stripping chamber from said vertical opening, means for introducing gasiform material to the lower portion of each of said chambers, compartments and riser conduits, and means for recovering gasiform material from the upper portion of each of said regenerator and reactor chambers.

Providing a refiner today with a versatile and flexible system which will permit controlling the degree of conversion of a particular feed material or a variety of different feed materials simultaneously in a simplified and unitary system has become increasingly important particularly with consumer product requirements varying with the seasons of the year and the need for treating various hydrocarbon feed materials including relatively high-boiling range feed materials such as heavy gas oils, topped and reduced crudes. These hydrocarbon feed materials including gas oils, residual oils and reduced crudes not only require conversion conditions of different severity, but also contain constituents which are difficult to vaporize at the temperature and pressure conditions employed and require extensive or relatively long hydrocarbon conversion times of contact. Non-vaporizable or liquid-like constituents present in hydrocarbon feed materials contribute, if not properly handled, to the formation of relatively large catalyst agglomerants which defluidize readily, thereby making it necessary to shut down the operation. In addition, considerable difficulty has been experienced in uniformly distributing relatively high-boiling hydrocarbon feed materials on the catalyst, controlling the severity of conversion, as well as controlling the time of contact of the feed with the catalyst such that conversion to desired low-boiling products is obtainable. Accordingly, the improved system and method of operation described herein is directed to providing a simplified system which maximizes recovery of desired hydrocarbon products and which will permit converting a relatively wide range or variety of hydrocarbon feed materials either separately or simultaneously. In the method described herein it is contemplated employing a gasiform diluent material with the hydrocarbon feed material to assist in atomization or vaporization of the hydrocarbon feed into relatively fine droplets to obtain more intimate contact of the hydrocarbon feed with the finely divided catalytic material employed in the system. The hydrocarbon reactant material either with or without a gasiform diluent material is mixed with finely divided catalytic material withdrawn from the regeneration zone to form suspensions thereof at a temperature in the range of from about 800° F. to about 1025° F., which are passed separately upwardly through riser-reactors discharging in the reaction zone. Generally, the temperature of the suspension passed through the riser terminating in the dilute catalyst phase of the reaction zone will be at a temperature in the range of from about 900° F. to about 1025° F. with the suspension discharging in the lower portion of the dense fluid bed of catalyst in the reaction zone being 50 to 100 degrees less. The dense fluid bed of catalyst in the reaction zone will be maintained at a temperature in the range of from about 800° F. to about 1000° F., more usually from about 900° F. to about 950° F. and will be heat supplied by the catalyst discharged from the plurality of risers. Generally, the hydrocarbon reactant passed with catalyst through the riser discharging in the dilute catalyst phase will be subjected to a hydrocarbon conversion time of from about 1 to about 6 seconds and will be separated from the catalyst in the dilute phase by suitable cyclone separator means in combination with reducing the velocity of the suspension discharged from one or more risers so that the catalyst will settle out and fall onto the dense fluid bed of catalyst therebelow. More complete separation of catalyst from hydrocarbon products is accomplished in the upper portion of the reaction zone employing the cyclone separators, with the thus separated catalyst being returned as confined streams to the dense bed of catalyst therebelow. On the other hand, the hydrocarbon reactant material passed with catalyst through the riser discharging into the lower portion of the dense fluid bed of catalyst in the reaction zone will be subjected to a much extended hydrocarbon conversion time, in the range of from about 3 to about 15 seconds.

During conversion of the hydrocarbon reactant materials, difficultly vaporizable hydrocarbon materials become deposited upon the catalyst which require further treatment to remove these materials from the catalyst. Furthermore, when removing finely divided catalytic material from a hydrocarbon conversion zone considerable volatile hydrocarbon material is entrained with the withdrawn catalyst which, if not more completely removed and recovered from the catalyst is burned in the regeneration zone. To improve the recovery of entrained and adsorbed hydrocarbon materials on the catalyst, applicants continuously withdraw the catalytic material as a dense fluid bed tangentially from the dense fluid bed of catalyst in the reaction zone and pass the thus withdrawn catalyst longitudinally into and through at least one elongated annular stripping zone for contact with stripping gas as herein described. It is apparent, therefore, that the method of stripping as herein provided has for its purpose the improved recovery of entrained volatile hydrocarbon materials, as well as providing further decomposition and recovering decomposition products of relatively heavy hydrocarbon material adsorbed on the catalytic material. The improved decomposition and stripping treatment proposed herein is accomplished in part by maintaining the catalytic material during stripping under elevated temperature conversion conditions while maintaining the catalyst in a relatively dense fluidized condition and continuously contacting the fluidized catalyst with fresh stripping gas as it moves longitudinally through the stripping zone. The residence time of the catalytic material in the stripping zone will be dependent upon the circumference of the reactor chamber, the number of annular stripping sections of compartments employed, as well as the height of the relatively dense fluid bed of catalyst maintained in the annular stripper. The time of residence or sojourn of the catalytic material in the stripper employing this method of this invention may be maintained in the range of from about 30 seconds up to about 4 minutes. In the segregated annular stripper it is contemplated maintaining the catalyst mass velocity flowing generally horizontally through the annular stripper in the range of from about 200 to about 2000 lbs. per minute per square foot.

Having thus provided a general description of the improved method and means of this invention reference is now had by way of example to the drawings, which present diagrammatically in elevation and cross section preferred arrangements of the apparatus for practicing the improved method of this invention.

Referring now to FIGURE I by way of example, a unitary vessel is shown having an upper cylindrical reactor chamber 2 and a lower cylindrical regenerator chamber 4. Positioned within the reactor chamber 2 and extending substantially vertically upwardly from the bottom thereof to an upper portion of the reactor chamber is a semi-circular baffle member 6 of smaller diameter than the reactor and open in at least one side thereof to provide an elongated substantially vertical open passageway 8 more clearly shown in FIGURES II and III extending substantially the total vertical height of baffle member 6. One edge of baffle 6 is extended beyond the vertical open passageway 8 so that it is tangentially joined with the cylindrical wall of the reactor chamber. The substantially vertical cylindrical baffle 6 represents in cross section a spiral or a semi-circular shape extending tangentially inwardly from the wall of the reactor chamber forming at least one annular compartment surrounding an inner cylindrical compartment. The top of the annular compartment is joined or capped with a downwardly sloping baffle member 10 which is spaced above and apart from the upper edge of baffle 6 to form an open annular passageway 12. A first substantially vertical riser conduit 14 coaxially positioned with respect to the inner cylindrical compartment of the reactor chamber, extends from the lower portion of the regenerator chamber upwardly into an upper portion of the cylindrical compartment and terminates above a fluid bed of finely divided contact material 18 having an upper dense phase level 16 maintained in the lower portion of the cylindrical reactor compartment. The upper end or discharge end of riser conduit 14 is capped with a solid baffle member and provided with a plurality of elongated discharge slots 20 in the upper portion of the riser. Riser conduit 14 extends through a perforated baffle member or grid member 22 positioned across the lower cross section of the cylindrical compartment to form a distributor compartment 24 therebelow. A second riser conduit 26 extends from the lower portion of the regenerator chamber substantially vertically upwardly and terminates within distributor chamber 24. The upper discharge end of riser 26 is capped with a solid baffle member and provided with open discharge slots 28 in its upper periphery similar to those provided in riser 14. At least one standpipe 30 extends substantially vertically downwardly from the lower or bottom portion of the annular compartment into the lower portion of the regenerator chamber. When more than one annular compartment is employed as shown in FIGURE III, a standpipe is provided at the discharge end of each of the annular compartments. The standpipe is positioned or located in the annular compartment so that it is at the opposite end of the annular compartment from the elongated vertical slot or open passageway opening thereto. As more specifically shown in FIGURE III, there may be at least two annular compartments provided with suitable standpipes 30. Gaseous material for stripping the catalytic material in the annular stripping compartment is introduced by distributor means 32 supplied by conduit 34 positioned in the lower portion of the annular stripping compartment.

Aligned with the bottom open end of riser conduits 14 and 26 are provided vertically movable hollow stem plug valves 36 and 38 respectively. A vertically movable plug valve 40 is aligned with the bottom open end of standpipe 30. A cylindrical baffle member 42 open at its upper end and circumscribing the lower portion of risers 14 and 26 extends upwardly from the bottom of the regenerator chamber to form a withdrawal well about at least the inlet to the risers to prevent bypass or passage of contact material discharge from the bottom of standpipe 30 directly to the bottom open end of risers 14 and 26 prior to suitable regeneration of the contact material. A distributor means 44 shown as an annular manifold and supplied by conduit 46 is positioned within the lower portion of the withdrawal well for the introduction of gaseous material thereto. A distributor means 48 supplied by conduit 50 shown as a manifold is also provided in the lower portion of the regenerator chamber for introducing regeneration gaseous material thereto. Although not specifically shown in FIGURE I, a perforated baffle member or grid may be positioned across the lower cross section of the regenerator chamber and above distributor means 48.

In an embodiment of the apparatus of FIGURE I, it is contemplated positioning the well in the lower portion of the regenerator chamber about the lower portion of standpipe 30 instead of about the lower portion of the risers as shown and discussed above so that contact material discharged from the bottom of the standpipe and controlled by plug valve 40 must flow upwardly around the lower portion of the standpipe with a first portion of regeneration gaseous material before being discharged into a relatively dense fluid bed of contact material maintained in the lower portion of the regenerator chamber and about the lower portion of the risers. Additional regeneration gas is introduced to the lower portion of the dense fluid bed of contact material to complete the regeneration of the contact material.

When employing the apparatus of FIGURE I described above for the conversion of hydrocarbon feed materials and particularly the catalytic cracking of gas oil feed materials to lower boiling range products including gasoline, the fresh gas oil feed introduced by hollow stem plug valve 36 is mixed with finely divided hot regenerated catalyst entering the bottom of the riser and passed as a suspension at an elevated temperature of about 1000° F. and a superficial velocity of about 30 feet per second upwardly through riser cracking zone 14 and discharged through openings 20 into a dilute phase of catalyst above a relatively dense fluid bed of catalyst 18 maintained in the lower portion of the reaction zone. Simultaneously with the above, a recycle oil feed material introduced by hollow stem plug valve 38 is mixed with hot regenerated catalyst entering the bottom of the riser and passed as a suspension at a temperature of about 850° F. and a superficial velocity of about 30 feet per second upwardly through riser 26 into distributor zone 24 and then upwardly through distributor grid 22 into the lower cross section of the dense fluidized bed of catalyst 18 and flowing upwardly therethrough. Generally the relatively dense fluidized bed of catalyst 18 is maintained at a temperature of about 900° F. Hydrocarbon products discharged with catalyst from riser 14 separate from the catalyst and are combined in the dilute catalyst phase with hydrocarbon products recovered from the fluid bed of catalyst therebelow as well as stripped hydrocarbon products, passed through suitable cyclone separators in the upper portion of the reaction zone to remove entrained catalyst therefrom with the thus treated hydrocarbon products being freed of entrained catalyst then passed to suitable fractionator equipment, not shown, for separation into desired products. The catalyst discharged from the riser reactor 14 into the dilute catalyst phase separates from the hydrocarbon products due to a substantial reduction in velocity of the catalyst and falls into the dense fluid bed of catalyst in the lower portion of the reaction zone. The catalyst entrained with the hydrocarbon product and separated in the cyclone separator is returned to the dense fluid bed of catalyst by suitable diplegs. During conversion of the hydrocarbon feed materials with the catalyst in the riser-reactors, as well as in the dense fluid bed of catalyst, volatile and relatively non-volatile hydrocarbon materials are adsorbed on or entrapped within the catalytic material requiring further treatment to recover a disassociated hydrocarbon material from the catalyst. In the method of this invention the catalytic material containing entrained and adsorbed hydrocarbon material is removed from the dense fluid bed of catalyst in the reaction zone at substantially the same temperatures thereof by tangentially flowing a vertical portion of the dense fluid bed of catalyst 18 through a substantially vertical elongated open passageway into one end of at least one elongated annular stripping zone in indirect heat exchange with the fluid bed of catalyst 18 in the reaction zone. In the annular stripping zone the catalytic material is maintained in a relatively dense fluidized condition by the introduction of gaseous stripping material to the lower portion thereof as the fluid bed of catalyst moves longitudinally through the annular stripper to a catalyst withdrawal standpipe or passageway positioned at the opposite end of the annular stripping zone. As discussed herein, independent flow control of gaseous stripping material to sections of the annular stripping chamber may be employed and there may be at least two semi-circular annular stripping zones as shown in FIGURE III or there may be two continuous annular stripping zones substantially completely circumscribing the inner cylindrical reaction zone as shown in FIGURE II. The annular stripping compartment is capped by a downwardly sloping baffle member having an angle greater than the angle of repose of the catalyst so that catalyst discharged from riser 20 and the catalyst in the dilute phase in the upper portion of the reaction zone will be prevented from accumulating on the upper surface of the baffle 10 and the catalyst must pass or settle into the dense fluid bed of catalyst prior to entering the annular stripping zone as hereinbefore described. Stripped hydrocarbon products of reaction and stripping gas recovered from the upper portion of the dense phase of catalyst in the annular stripping zone pass through the annular open passageway 12 and combines with a hydrocarbon product in the dilute phase of catalyst in the upper portion of the reaction zone above bed 18. The stripped catalyst is withdrawn from the opposite end of the annular stripping zone after longitudinally flowing therethrough by a suitable withdrawal passageway or standpipe and passed to a relatively dense fluid bed of catalyst 52 maintained in the lower portion of the regeneration zone 4. In the regeneration zone catalytic material contacted with nonstrippable carbonaceous material is regenerated by burning in the presence of oxygen containing gas introduced by distributors 48, thereby heating the catalyst to an elevated temperature of about 1125° F. and suitably restoring the catalyst activity for recycle to the inlet of the riser-reactors. In the specific example shown in FIGURE I, regenerated catalyst at an elevated temperature of about 1125° F. enters the top of the withdrawal well defined by baffle 42 and flows downwardly therethrough countercurrently to fluffing or fluidizing gas such as steam introduced to the lower portion of the well to maintain the catalyst in a fluid condition for flow to the bottom open end of each riser conduit. Regenerated effluent gases containing entrained catalyst pass through suitable cyclone separators in the upper portion of the regenerator for the recovery of entrained catalyst therefrom, which catalyst is returned to the bed of catalyst therebelow by suitable diplegs with the flue gases freed of entrained catalyst being withdrawn from the upper portion of the regeneration zone.

In the arrangement of apparatus shown in cross section by FIGURE III, employing a plurality of semi-circular annular stripping zones, gaseous stripping material is preferably introduced separately to each stripping zone so that independent control of the flow of gaseous material thereto may be maintained. It is contemplated, however, in the arrangement of either FIGURES II or III of separating or dividing the stripping gas distributor means or manifold into a plurality of separate and independent flow control distributor means so that the velocity of the stripping gas passed to various sections of the annular stripping zone may be independently flow controlled as desired.

It is intended that all matter contained in the above description or shown in the accompanying drawings shall be interpreted as illustrative and not in a limiting sense. Various modifications and alterations of the process and arrangement of apparatus of this invention may become apparent to those skilled in the art without departing from the scope of this invention.

We claim:
1. An apparatus for the segregated conversion and recovery of hydrocarbons comprising in combination an upper reaction chamber superimposed by a separation chamber, an annular stripping chamber separated from said reaction chamber by a common baffle member open in at least one vertical side thereof to provide a passageway for the tangential flow of contact material from said reaction chamber into said stripping chamber, a standpipe extending downwardly from a segment of said annular stripping chamber which is remote from said passageway in respect to the horizontal path of flow of catalyst through said stripping chamber to the lower portion of a regeneration chamber positioned below said stripping chamber, a withdrawal chamber open at its upper end and of smaller diameter than said regeneration chamber extending upwardly from the bottom of said regeneration chamber, the bottom open end of said standpipe terminating outside of said withdrawal chamber, a perforated grid member positioned across the lower cross section of said reactor chamber to form a distributor chamber therebelow, a first riser conduit extending upwardly from said withdrawal chamber and terminating in an upper portion of said reaction chamber, a second riser conduit extending upwardly from said withdrawal chamber and terminating within said distributor chamber, a vertically movable hollow stem plug valve aligned with the bottom open end of each of said riser conduits, a vertically movable plug valve aligned with the bottom open end of said standpipe, means for introducing gaseous ma- terial to the lower portion of said regeneration chamber and said withdrawal chamber, means for introducing gaseous material to the lower portion of said stripping chamber, means for withdrawing gaseous material from the upper portion of said regeneration chamber and means for withdrawing vaporous material from the upper portion of said separation chamber.

2. The apparatus of claim 1 wherein said standpipe and said passageway are substantially adjacent but separated by a common substantially vertical baffle member.

3. The apparatus of claim 1 wherein there are at least two separated longitudinal stripping chambers about said reaction chamber to which the flow of stripping gas to the lower portion thereof is independently controlled to separate portions thereof.

4. The apparatus of claim 1 wherein the stripping chamber is capped by a spaced apart downwardly sloping baffle member to form an annular opening substantially the total longitudinal length thereof in open communication with said separation chamber.

5. The apparatus of claim 1 wherein the upper end of the first riser conduit is provided with discharge means for deflecting material passed through the riser outwardly in a longitudinal direction into the chamber into which it discharges.

6. The apparatus of claim 1 wherein the riser conduits and standpipe are substantially vertical and the first riser conduit is coaxially positioned with respect to said reaction chamber.

7. The apparatus of claim 1 wherein the perforated grid member is an inverted dish-shaped member.

8. The apparatus of claim 1 wherein a plurality of independent gas flow controlled distributor means are provided in the lower portion of said stripping chamber.

9. The apparatus of claim 1 wherein said substantially vertical open passageway extends from said perforated grid member to substantially the top of said stripping chamber.

10. A system for the segregated conversion and recovery of hydrocarbons which comprises a reactor chamber containing a relatively dense fluid bed of solid material in the lower portion thereof superimposed by a dilute phase of solid material, a regenerator chamber containing a relatively dense fluid bed of solid material in the lower portion thereof, a first conduit means for passing a suspension of solid material and gasiform material from the lower portion of said regeneration chamber for discharge into said dilute phase of solid material in said reactor chamber, a perforated grid member positioned across the lower cross section of said reactor chamber to form a distributor chamber therebelow, a second conduit means for passing a suspension of solid material and gasiform material from the lower portion of said regenerator chamber into said distributor chamber, at least one annular stripping chamber separated from said reactor chamber by a common substantially vertical baffle member about said reactor chamber and in indirect heat exchange therewith, the upper portion of said stripping chamber being in open communication with said dilute phase of solid material, passageway means in said common baffle member for tangentially flowing passing solid material from said dense phase of said material in said reactor chamber throughout substantially the vertical height thereof into one end of said stripping chamber for longitudinal flow therethrough to a withdrawal standpipe positioned in a segment thereof which is remote from said passageway means in respect to the horizontal path of flow of catalyst through said stripping chamber, means for introducing gasiform material to the lower portion of said stripping chamber for contact with said longitudinally flowing solid material, means for passing solid material from said stripping chamber through said withdrawal standpipe to said regeneration chamber and means for recovering gasiform material from the upper portion of each of said chambers.

11. An apparatus for the segregated conversion and recovery of hydrocarbons comprising in combination a reactor chamber, an elongated annular stripping chamber circumscribing said reactor chamber, one end of said annular stripping chamber being in open communication throughout substantially the vertical height thereof with a dense fluid bed of contact material in the lower portion of said reactor chamber to permit tangential flow of contact material in a relatively dense fluid condition from said reactor chamber into and through said annular stripping chamber, conduit means for withdrawing stripped contact material from a segment of said annular stripping chamber which is remote in respect to the horizontal path of flow of catalyst through said stripping chamber from the segment at which the contact material is introduced, means for introducing gaseous material to the lower portion of said annular stripping chamber, a perforated grid member positioned across the lower cross section of said reactor chamber to form a distributor chamber therebelow, means for introducing a first suspension of reactant material and contact material into said distributor chamber, means for separately introducing a second suspension of reactant material and contact material into an upper portion of said reactor chamber and means for removing gaseous and vaporous material from the upper portion of said reactor chamber.

12. A fluid system for a segregated conversion and recovery of hydrocarbons by contacting same with finely divided solid material which comprises a reactor chamber containing a relatively dense fluid bed of solid material in the lower portion thereof superimposed by a dilute phase of solid material, a regenerator chamber containing a relatively dense fluid bed of contact material in the lower portion thereof, means for passing solid material from said regeneration chamber as a suspension with a first gasiform material for discharge above the dense fluid bed of solid material in said reactor chamber, a perforated grid member positioned across the lower cross section of said reactor chamber to form a distributor chamber therebelow, means for passing solid material from said regeneration chamber as a second separate suspension with a second gasiform material into said distributor chamber, at least one annular stripping chamber about at least a portion of said reactor chamber, means for passing gaseous material from the upper portion of said annular stripping chamber into the upper portion of said reactor chamber, a substantially vertical open passageway tangentially communicating between the dense fluid bed of solid material in said reactor chamber and a fluid bed of solid material in said annular stripper chamber, means for passing solid material in said annular stripping chamber tangentially therethrough as a fluid bed to a solid material withdrawal means positioned in a segment thereof which is remote from said open passageway in respect to the horizontal path of flow of catalyst through said stripping chamber, means for introducing gasiform material to the lower portion of said annular stripping chamber, means for passing solid material by said withdrawal means to said regeneration chamber and means for withdrawing gasiform material from the upper portion of said reactor chamber.

13. An apparatus for the segregated conversion and recovery of hydrocarbons which comprises in combination, a reactor chamber containing a relatively dense fluid bed of contact material, an annular stripping chamber separated from said reactor chamber by a common vertical baffle member open in at least one vertical side thereof to provide a passageway for the tangential flow of contact material from said reactor chamber, the upper portion of said stripping chamber being in open communication with the upper portion of said reactor chamber providing a passageway for the flow of gaseous material from said stripping chamber to said reaction chamber, means for continuously flowing a relatively dense fluid bed of contact material from said reactor chamber tangentially through said passageway into and through said stripping chamber, a first substantially vertical conduit extending upwardly into and terminating above said dense fluid bed of contact material in said reactor chamber, means for passing a first suspension of contact material and gasiform reactant material through said first conduit, a perforated grid member positioned across the lower cross section of said reactor chamber to form a distributor chamber therebelow, a second substantially vertical conduit extending upwardly into and terminating within said distributor chamber, means for passing a second suspension of contact material and reactant material through said second conduit, a withdrawal conduit positioned in a segment of said stripping chamber which is remote from said passageway in respect to the horizontal path of flow of catalyst through said stripping chamber, means for introducing gaseous material to the lower portion of said stripping chamber comprising a plurality of independent gas flow controlled distributor means, means for passing contact material from said withdrawal conduit to a regeneration chamber, means for passing contact material from the regeneration chamber to the inlet of each of said first and second conduit means and for recovering gasiform material from the upper portion of said reactor and said regeneration chambers.

References Cited in the file of this patent

UNITED STATES PATENTS

| | | |
|---|---|---|
| 2,612,433 | Nicolai et al. | Sept. 30, 1952 |
| 2,672,407 | Leffer | Mar. 16, 1954 |
| 2,698,281 | Leffer | Dec. 28, 1954 |
| 2,728,642 | Cunningham et al. | Dec. 27, 1955 |
| 2,871,186 | Francisco et al. | Jan. 27, 1959 |
| 3,011,969 | Mader | Dec. 5, 1961 |
| 3,053,752 | Swanson | Sept. 11, 1962 |
| 3,053,753 | Slyngstad et al. | Sept. 11, 1962 |

UNITED STATES PATENT OFFICE
CERTIFICATE OF CORRECTION

Patent No. 3,142,542                July 28, 1964

Eugene F. Schwarzenbek et al.

It is hereby certified that error appears in the above numbered patent requiring correction and that the said Letters Patent should read as corrected below.

Column 2, line 40, for "difficulty" read -- difficultly --; column 9, line 62, for "said", second occurrence, read -- solid --.

Signed and sealed this 12th day of January 1965.

(SEAL)
Attest:

ERNEST W. SWIDER                EDWARD J. BRENNER
Attesting Officer                Commissioner of Patents